(12) United States Patent
Kanevsky et al.

(10) Patent No.: US 7,149,651 B2
(45) Date of Patent: Dec. 12, 2006

(54) CONFIDENCE BLANKET FOR RANDOMLY-LOCATED MEASUREMENTS

(75) Inventors: Valery Kanevsky, San Lorenzo, CA (US); John Eidson, Palo Alto, CA (US); Bruce Hamilton, Menlo Park, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 18 days.

(21) Appl. No.: 10/846,061

(22) Filed: May 14, 2004

(65) Prior Publication Data

US 2005/0256678 A1 Nov. 17, 2005

(51) Int. Cl.
*G06F 11/00* (2006.01)
(52) U.S. Cl. ......................... 702/181; 703/14
(58) Field of Classification Search ................ 702/181, 702/182–185, 188; 703/14
See application file for complete search history.

(56) References Cited

U.S. PATENT DOCUMENTS

| 4,901,009 | A | | 2/1990 | Schultze et al. | |
|---|---|---|---|---|---|
| 2004/0034465 | A1 | * | 2/2004 | Spiesberger | ................ 701/200 |

FOREIGN PATENT DOCUMENTS

EP 0 518 116 12/1992

OTHER PUBLICATIONS

Anthony, M. et al, "Computational Learning Theory," Cambridge University Press, 1992, Table of Contents and Cover, 7 pages, (entire document will be furnished upon request).

Shiryaev, A.N., "Probability," Second Edition, translated by R.P. Boas, Springer-Verlag New York Inc., 1989, Cover Page and Table of Contents, 12 pages, (entire document will be furnished upon request).

Devroye, Luc et al, "Combinatorial Methods in Density Estimation," Springer-Verlag New York, Inc., 2001, Cover Page and Table of Contents, 9 pages, (entire document will be furnished upon request).

Vapnik, Vladimir N., "Statistical Learning Theory," AT&T Research Laboratories, John Wiley & Sons, 1998, Cover Page and Table of Contents, 16 pages (entire document will be furnished upon request).

Evans, Greg et al., "The Optimization and Application of the W.C.Y. Lee Propagation Model in the 1900 MHz Frequency Band," TEC Cellular, Inc., IEEE 1997, pp. 87-91.

European Search Report dated Aug. 8, 2005.

A.M.D. Turkmani, D. A. Demery, J. D. Parsons—"Measurement And Modelling Of Wideband Mobile Radio Channels At 900 MHz"; IEEE Proceedings-I; vol. 138, No. 5, Oct. 1991; pp. 447-457.

Leandro Juan-Liacer, Luis Ramos and Narcis Cardona—"Application Of Some Theoretical Models For Coverage Prediction In Macrocell Urban Environments"; IEEE Transactions On Vehicular Technology, vol. 48, No. 5, Sep. 1999; pp. 1463-1468.

\* cited by examiner

*Primary Examiner*—Edward Raymond

(57) ABSTRACT

Embodiments of the present invention reconstruct an underlying phenomenon without the need for predicting a functional form for that signal, by establishing an upper bound and a lower bound for the value of the phenomenon at every point within a measurement space. By acquiring a large enough number of measurements of the phenomenon, a sufficiently high probability that the value of said phenomenon lies between said upper and said lower bound at every point within said measurement space may be established.

24 Claims, 4 Drawing Sheets

CONFIDENCE BLANKET FOR RANDOMLY-LOCATED MEASUREMENTS

CROSS-REFERENCE TO RELATED APPLICATIONS

The present application is related to concurrently filed, co-pending, and commonly assigned U.S. patent application Ser. No. 10/846,301, entitled "ADAPTIVE DATA COLLECTION," the disclosure of which is hereby incorporated herein by reference.

TECHNICAL FIELD

Embodiments of the present invention are directed towards the reconstruction of measurable phenomena, and more specifically to reconstructions of underlying phenomena that can use randomly distributed inaccurate measurements and do not assume a function type for the phenomenon.

BACKGROUND OF THE INVENTION

The design and management of complex systems often involve the reconstruction of patterned phenomena. In order to better design cellular telephone networks, for example, engineers need to have accurate approximations of transmission tower signals at all points within the network's coverage area. Other examples may include computer packet routing software that require accurate estimations of routing times to every node within the network, or atmospheric prediction models that require accurate estimations of temperatures at all points covered by the models, or cell density estimations for tissue samples. In order to design and implement applications in these, and like systems, designers often rely on their knowledge of the nature of the phenomena upon which those applications are based.

Most applications do not involve phenomena that can be perfectly reconstructed, with absolute precision and certainty, at every point within the measurement space, but do involve variables capable of being measured. Many methods have been developed that approximate or estimate the value of a phenomenon from those measurements within a limited region. In traditional methods, designers assume that the phenomenon behaves as a polynomial. Through continued measurements, such a method will continue to refine the approximation, but will retain the assumption that the underlying phenomenon values are polynomic through the measurement space.

Although the most common assumption is that phenomena mimic polynomials, an understanding of what generated the phenomena may lead to a trigonometric model, an exponential model, or some other appropriate mathematical prediction of value. Typically, reconstruction using these models will take the form of a measurement system that attempts to collect enough points to satisfy the function type assumption, and to further isolate any unknown parameters of that function. For example, spectrum analysis assumes that a signal can be decomposed into some combination of sine and cosine functions. Using a spectrum analyzer, the phenomenon being reconstructed is then measured and the appropriate coefficients for the sine and cosine functions are determined through continued measurement. When the data is plotted on top of the prediction, the functional form will then approximate the data. Residuals may also be calculated that give an estimate of how well the measured data fits the predicted functional form.

BRIEF SUMMARY OF THE INVENTION

Embodiments of the present invention reconstruct an underlying phenomenon, without the need for predicting a functional form for that signal, by establishing an upper bound and a lower bound for the value of the phenomenon at every point within a measurement space. By acquiring a large enough number of measurements of the phenomenon, a sufficiently high probability that the value of said phenomenon lies between said upper and said lower bound at every point within said measurement space may be established.

Further embodiments of the present invention are systems for reconstructing a phenomenon that include a means for measuring the phenomenon computer readable memory that stores those measurements, and a processor. These systems run code that calculates an upper bound and a lower bound for the value of the phenomenon at every point within a measurement space, and code that calculates a bound on the probability, dependent upon the number of said measurements, that the value of the phenomenon lies between the upper bound and the lower bound.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Embodiments of the present invention do not have to explicitly assume any functional form for the underlying phenomenon, but rather, attempt to bound errors in the measurement of it. If a system designer knows, to a high enough degree of confidence that the value of a future measurement of the phenomenon will lie between an upper bound and a lower bound of sufficiently narrow separation, then it may become unnecessary to predict the exact form of that phenomenon. For example, in the reconstruction of a signal from a cellular transmission tower, designers can use measurements of the signal produced to generate an upper and lower bound for that signal, rather than a specific function-prediction of that signal's value through the measurement space. If such a reconstruction leads to a 95% confidence that the signal lies within a 10 milliwatt range, then exact reconstruction of the underlying signal can be become unnecessary.

Figure 1:
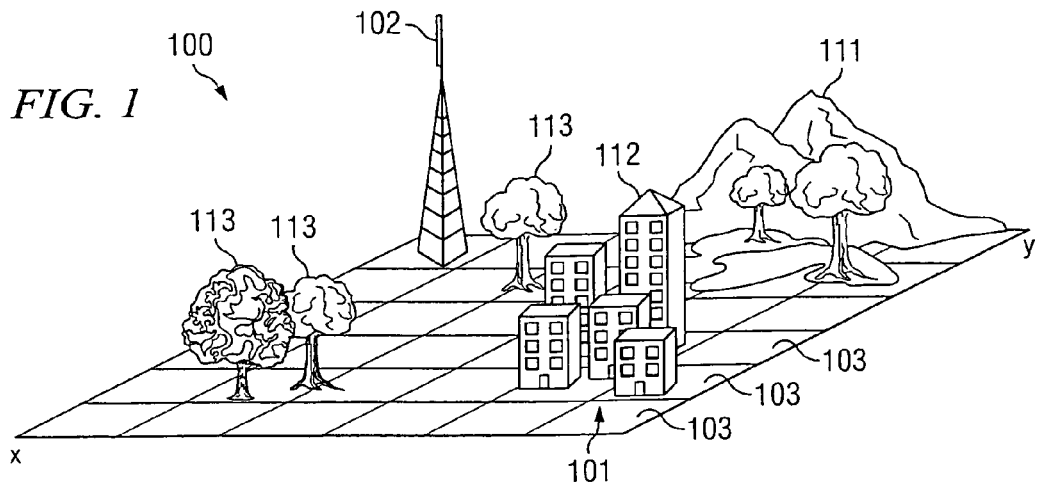
FIG. 1 illustrates a cellular telephone network arranged according to one embodiment of the present invention.

FIG. 1 illustrates a cellular telephone network arranged according to one embodiment of the present invention. The service area for network 100 is represented by measurement space 101 bounded by an x and a y axis, with a transmission tower 102 located at the origin. Measurement space 101, may be further divided into 48 sub-regions 103 representing a portion of the area within range of transmission tower 102. In order to properly maintain cellular service, the network provider needs to have an accurate measurement of the signal emitted by tower 102 in every sub-region 103. However, the signal emitted by tower 102 may not be uniformly measurable across the sub-regions. Physical obstacles, such as mountains 111, buildings 112, and trees 113 will interfere, reflect, and otherwise distort the underlying signal within a sub-region. This volatility leads to increased uncertainty in the measurements and makes reconstruction of the underlying signal more difficult in sub-regions that contain such obstacles.

Figure 2:
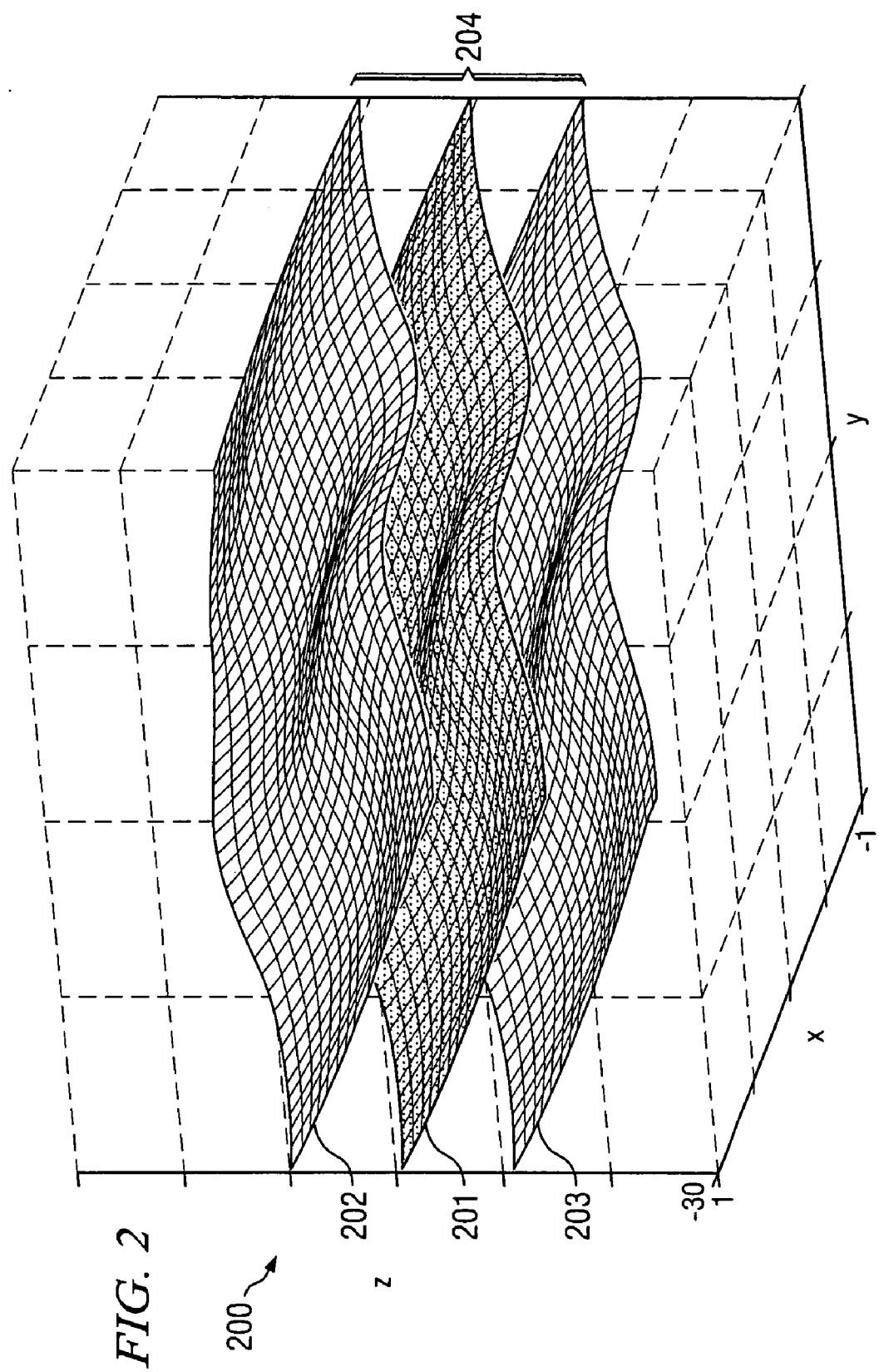
FIG. 2 illustrates a reconstruction of an underlying phenomenon according to an embodiment of the present invention.

FIG. 2 illustrates a reconstruction of an underlying phenomenon according to an embodiment of the present invention. In FIG. 2, graph 200 represents reconstruction of signal 201, which is the signal of transmission tower 102 of FIG. 1. Embodiments of the present invention determine an upper bound 202 and a lower bound 203, and calculate a lower bound on the probability that a new measurement of signal 201 will lie between upper bound 202 and lower bound 203. If the separation 204 is appropriately small, and the probability is appropriately high, a function based prediction of signal 201 can be rendered unnecessary. When initially generated, some embodiments of the present invention may create upper bound 202 as a plane located at $+\infty$ and lower bound 203 as a plane located at $-\infty$. As additional measurements are taken, the calculations of upper bound 202 and lower bound 203 lead to surfaces that more precisely mirror underlying signal 201.

Embodiments of the present invention may use a mathematical analysis that places error bounds and confidence bounds on mathematical models built using randomly acquired measurements, such as the measurement of the spatial variation of the radio frequency (RF) fields associated with a cellular phone infrastructure. This analysis uses a probably approximately correct (PAC) model of the underlying data, as discussed by M. Anthony and N. Biggs in *Computational Learning Theory*, Cambridge University Press, UK, 1997, the disclosure of which is hereby incorporated herein by reference. The following example mathematical method is described using the cellular telephone network as an example.

Confidence Blanket Calculations

An example set of measurements can be treated as a family of mutually independent random variables (measurements) $\xi(z)$, indexed by a space variable $z \in D$, where D is a domain in $\mathbb{R}^k$, a Euclidean space of dimension k. D can be represented as a union of open balls of a fixed radius r. Let $r^* > 0$ be the exact upper bound of values of r for which the representation is possible. Hence, $r^*$ is a characteristic of "smoothness" of the boundary of D. The space variable z, as viewed in the distributed measurements environment, is also random with a distribution function $F(b)=P(z \in b)$, where b is a measurable subset of D in the standard probability theory sense. In the context of RF field measurement, $k=2$. $\xi(z)$ represents the value of an individual observation (i.e. a measurement result) at point z. For the present example, $\xi(z)$ can represent a measurement of the RF power for a specific cellular channel and antenna. Let the mean value $E\xi(x)=m(x)$ be an unknown function of x describing the physical variable being measured. The function m(x) is to be estimated based on spatially distributed observations $\xi(z_i)$ at n points, represented by the set $A=\{z_1, \ldots, z_n\}$, where A is generated by a random process. For the example of cellular telephones as measurement devices, the randomness can arise from the normal usage patterns of cell phone users. This analysis does assume, however, that every subdomain of D (each sub-region of a cellular network) has sufficient coverage by measurement points.

PAC Learning of m(x)

Assumption 1: Measurement Points Distribution Regularity

If d, $d \subset D$, is a ball of a radius r and F is a distribution function of these points, in this embodiment it has been assumed:

$$F(d) \to 0, \text{ when } r \to 0 \text{ (continuity), and } F(d) > \gamma > 0 \qquad (1)$$

where $\gamma = \gamma(r)$ depends on the radius of a ball but not on the location of its center.

Assumption 2: Smoothness

It has also been assumed that the unknown function m(z) describing the underlying variable being measured is sufficiently smooth. Further consideration of excessively volatile functions m(z), that is, functions with unbounded change over a bounded domain are excluded.

$$|m(x)-m(y)| < K\rho^{\alpha}(x,y) \qquad (2)$$

for all $x,y \in D$; where K and $\alpha$ are positive constants, and $\rho(x,y)$ is the Euclidean distance between x and y.

Assumption 3: Bounded Measurement Range.

It has been further assumed that the random variable $\xi(z)$ representing a measurement result at point z has a limited range between some value a and some value b:

$$b \leq \xi(z) \leq a \qquad (3)$$

Construct an Estimator for the Measured Variable:

To construct an estimator M(x) for m(x), this embodiment defines $M(x)=M(x; \xi(z_1), \ldots, \xi(z_n))$ for $x \in D$, and mea surements $\xi(z_i)$ such that for any $\epsilon>0$, and $\delta>0$ there is an n, such that $$P\{\sup_{x\in D}|M(x;\xi(z_1),\ldots,\xi(z_n))-m(x)|<\varepsilon\}>1-\delta \quad (4)$$

If (4) is satisfied for an estimator M(x), a Confidence Blanket (CB) can be constructed for m(x). The CB at the confidence level 1-δ is defined such that for all x∈D $M(x;\xi(z_1),\ldots,\xi(z_n))-\epsilon$(lower bound 203)$<m(x)<M(x;\xi(z_1),\ldots,\xi(z_n))+\epsilon$(upper bound 202) and
(4) holds. (5)

For every subset s of measurements A, having cardinality |s|, this embodiment defines $$G(\xi,s)=\begin{cases}\frac{1}{|s|}\sum_{w\in s}\xi(w), & \text{if } |s|\neq 0\\ 0, & \text{if } |s|=0\end{cases}.$$

Let d(x;r) be an open ball of radius r centered at point x and s=s(x;r) is defined as A∩d(x;r), i.e. a subset of measurement points within d(x;r). Let S=S(r) be the class of all such subsets. One simple candidate for an estimator of m(x) is an average value of observations made at points inside d(x;r), i.e., $$M(x)=G(\xi,A\cup d(x;r))=\frac{1}{k_n}\sum_{w\in s}\xi(w) \quad (6)$$

where $k_n=k_n(x;r)=|s|$.

From equation (6), M(x) is effectively defined as a function on S.

$$M(x)=M(s(x;r))=M(s) \quad (7)$$

Hereafter all expectations and probabilities are conditional upon A={$z_1,\ldots,z_n$}, i.e., E(●) and P{●} stand for E(●/A) and P{●/A} respectively. This embodiment returns to using unconditional probabilities at the end of the derivation for CB bounds based on the Total Expectation/Probability Formula: E(●)=E(E(●/A)), as described in A. N. Shiryaev, *Probability*, Springer-Verlag, 1996, hereby incorporated by reference, which is transformed into P{●}=E(P{●/A}), when applied to indicators of events.

It follows from condition (1) that $k_n\to\infty$ along with n, for any x and r, i.e., measurements visit every sub domain of D infinitely often when n→∞.

If m̂(x) is the mean value of M(x) then (6) yields:

$$\hat{m}(x)=E(M(x))=\begin{cases}\frac{1}{k_n}\sum_{w\in d(x)}m(w), & \text{if } k_n\neq 0\\ 0, & \text{if } k_n=0\end{cases} \quad (8)$$

The natural way to assess $$P\{\sup_{x\in D}|M(x)-m(x)|>\varepsilon\}$$

is to approximate the difference M(x)−m(x) by M(x)−m̂(x) and then employ a variety of tools to deal with the latter which is a centralized sum of independent random variables.

Straightforward manipulations result in:

$$P\{\sup_{x\in D}|M(x)-m(x)|>\varepsilon\}=P\{\sup_{x\in D}|M(x)-\hat{m}(x)+\hat{m}(x)-m(x)|>\varepsilon\} \quad (9)$$

$$\leq P\{\sup_{x\in D}|M(x)-\hat{m}(x)|+\sup_{x\in D}|\hat{m}(x)-m(x)|>\varepsilon\}$$

$$=P\{\sup_{x\in D}|M(x)-\hat{m}(x)|>\varepsilon-\sup_{x\in D}|\hat{m}(x)-m(x)|\}$$

It follows from the definition of M(x) and m̂(x), which also can be viewed as functions on S, that $$\sup_{x\in D}|M(x)-\hat{m}(x)|=\sup_{s\in S}|M(s)-\hat{m}(s)| \quad (10)$$

The original definition of "sup" can be thus reduced over an infinite number of points x in D to a definition over a finite number of different subsets of S obtained by intersecting S with the set B(r)={d(x;r)} of all balls of fixed radius r.

The upper bound on the cardinality |S| of S will play a role in the quality of the estimate of $$P\{\sup_{x\in D}|M(x)-m(x)|>\varepsilon\}.$$

Computing the Bounds on |S|

This embodiment derives an upper bound for |S| using Sauer's Lemma as described in L. Devroy and G. Lugosi, *Combinatorial Methods in Density Estimation*, Springer-Verlag, 2001, hereby incorporated herein by reference. Let V be the Vapnic-Chervonenkis (VC), dimension, as described in V. Vapnik, *Statistical Learning Theory*, John Wiley & Sons, 1998, hereby incorporated herein by reference of the set of balls of the same radius and let U be the VC dimension of the set of all balls. V≤U=k+1=3 in the case of the Euclidean plane. On the other hand, a set of three points at the vertices of an equilateral triangle can be shattered by a set of circles with a fixed radius r greater than $\sqrt{3}/3$, if the distance between vertices is 1. Therefore V≥3 and therefore V=3. Sauer's Lemma now implies: $|S|\leq(ne/3)^3<n^3(e=2.7\ldots)$. However it is possible to bound |S| more tightly.

Let the maximal achievable value of |S| over all sets of n points, called the shatter coefficient for the set of all balls B(r) of fixed radius r in $\mathbb{R}^2$ be denoted as N(n). This value is independent of r. The following can establish upper and lower bounds on N(n).

Lemma 1. $n^2-n+2\leq N(n)$ Using a simple construction to prove the lower bound, n points can be equidistantly placed on the circumference of a circle of radius h. Then, for any integer 1≤k<n, all n subsets of k consecutive points can be cut off by circles of a fixed radius r>h. Including the empty set and the entire set of n points, the total number of generated subsets is n(n−1)+2.

Lemma 2. $N(n)\leq n^2-n+2$ For each point in A place a circle centered at this point with the same radius (say one) as is used to achieve N(n) distinct subsets. This arrangement of circles partitions the plane into a number of components, usually referred to as faces. The quantity of components can be an upper bound for N(n). Let c be one of the centers of unit circles, which generate S. Generally speaking $c \notin A$. A corresponding subset $s(c) \subset S$ consists of all points whose distance to c is less than 1. By construction these are exactly the points whose corresponding circles bound the component to which c belongs, and every component in the arrangement contains no more than one c. Therefore $N(n) \leq \{\text{maximum number of components}\} = n^2 - n + 2$. The latter can be proven by induction arguments.

Derivation of the CB for m(x)

Theorem 1. Under assumptions 1, 2 and 3

$$P\{\Omega\} \leq 2(n^2 - n + 2)(\exp(-\lambda^2 h^2(n)) + 4\exp(-n\beta^2/32)) \quad (11)$$

where $\lambda = \sqrt{2}/(b-a)$, and $h(n) = (n(\gamma - \beta))^{1/2}(\epsilon - Kr^\alpha)$.

Proof

Sensible bounds for $$P\left\{\sup_{x \in D}|M(x) - \hat{m}(x)| \geq \epsilon - \sup_{x \in D}|\hat{m}(z) - m(x)|; B_\beta\right\}$$

require $$\sup_{x \in D}|\hat{m}(x) - m(x)|$$

to be limited by $\epsilon$. Given $B_\beta$ has occurred, $$\sup_{x \in D}|\hat{m}(x) - m(x)| = \sup_{x \in D}\left|\frac{1}{k_n}\sum_{w \in s}(m(w) - m(x))\right|$$

can be assessed, due to the definition (8) and Assumption 2 (smoothness). All terms $|m(w) - m(x)|$ in (8) are bounded uniformly, since w and x are inside a certain ball $d(x;r)$ of radius r: $|m(w) - m(x)| \leq K\rho^\alpha(x,w) \leq Kr^\alpha$. This leads straight to:

$$|\hat{m}(x) - m(x)| = \frac{1}{k_n}\sum_{w \in s}|m(w) - m(x)| \leq \frac{1}{k_n}\sum_{w \in s}|m(w) - m(x)| \leq Kr^\alpha$$

Therefore, a choice for r such that $Kr^\alpha < \epsilon$ is feasible. Two more observations are needed to bound the probability in (9). First, the reduction in (10) allows for representing probabilities in (9) in terms of a new variable, s. Second, the event $$\left\{\sup_{s \in S}|M(s) - \hat{m}(s)| \geq t; B_\beta\right\}$$

is equivalent to the union $$\bigcup_{s \in S}\{|M(s) - \hat{m}(s)| \geq t; B_\beta\}.$$

These observations yield the chain of inequalities:

$$P\left\{\sup_{s \in S}|M(s) - \hat{m}(s)| \geq \epsilon - \sup_{z \in D}|\hat{m}(z) - m(z)|; B_\beta\right\} \leq \quad (12)$$

$$P\left\{\sup_{s \in S}|M(s) - \hat{m}(s)| \geq \epsilon - Kr^\alpha; B_\beta\right\} \leq$$

$$\sum_{s \in S} P\{|M(s) - \hat{m}(s)| \geq \epsilon - Kr^\alpha; B_\beta\}$$

The number of summands in (12) is not greater than $|S| \leq n^2 - n + 2$, hence Hoeffding's inequality applied to every term in (12) implies:

$$P\left\{\sup_{s \in S}|M(s) - \hat{m}(s)| > \epsilon - Kr^\alpha; B_\beta\right\} \leq \quad (13)$$

$$2(n^2 - n + 2)\max_{s \in S}\left\{\exp\left(-2\frac{k_n}{(b-a)^2}(\epsilon - Kr^\alpha)^2\right)\right\} =$$

$$2(n^2 - n + 2)\exp(-\lambda^2(\epsilon - Kr^\alpha)^2 k_n)$$

where $k_n$ is such that $$B_\beta = \left\{\sup_{x \in D}|k_n(x)/n - F(d(x))| \leq \beta\right\}$$

holds. Now the analysis returns to unconditional probabilities via TEF, i.e.

$$P\left\{\sup_{s \in S}\left|M(s) - \hat{m}(s)\right| \geq \epsilon - Kr^\alpha; B_\beta\right\} \leq$$

$$2(n^2 - n + 2)E\left\{\exp\left(\lambda^2(\epsilon - Kr^\alpha)\min_{s \in S}k_n\right); B_\beta\right\}$$

where $E\{X(\omega); A\}$ stands for $$\int_A X(\omega)P(d\omega),$$

$X(\omega)$ is a random variable, A is a measurable subset of a probability space and $P(\bullet)$ is a probability measure on this space. Remember that random variable $k_n$ is a function of x. Since $$E\left\{\exp\left(-\lambda^2(\epsilon - Kr^\alpha)\min_{s \in S}k_n\right); B_\beta\right\} = E\left\{\exp\left(-\lambda^2(\epsilon - Kr^\alpha)^2\min_{x \in D}k_n\right); B_\beta\right\}$$

on $B_\beta$ the value of $$\frac{k_n}{n} \geq \gamma - \beta$$

and consequently, $$E\{\exp(-\lambda^2(\varepsilon - Kr^\alpha)^2 \min_{x \in D} k_n); B_\beta\} \le$$
$$P(B_\beta)\exp(-n\lambda^2(\varepsilon - Kr^\alpha)^2(\gamma - \beta)) < \exp(-\lambda^2 h^2(n)).$$

Finally (6), (7), and (12) yield the following bound:

$$P\{\Omega\} \le 2(n^2 - n + 2)(\exp(-\lambda^2 h^2(n)) + 4\exp(-n\beta^2/32)).$$

Now the confidence probability for CB can be estimated as:

$$P\{\sup_{x \in D}|M(x;\xi(z_1), \ldots, \xi(z_n)) - m(x)| < \varepsilon\} \ge \qquad (14)$$
$$1 - 2(n^2 - n + 2)(\exp(-\lambda^2 h^2(n)) + 4\exp(-n\beta^2/32))$$

Remark 1. This bound holds for an arbitrary r and $\beta$ within the interval $0 < \beta < \gamma$. Recall that $\gamma$ is a function of r and therefore there are optimal values for r and $\beta$ that maximize the bound in (14).

Remark 2. Assumption 3 can be relaxed in favor of any condition on the distribution of $\xi(z)$ that preserves, for example, an exponential decay of the density's tail. The finiteness of $E(\exp(\nu\xi(z)))$ for some $\nu > 0$, uniformly over z, for instance, is sufficient. It permits using Hoeffding's inequality to estimate the probability in (9).

Integral Metric

Some preliminary preparations have been made that are similar to the previous case. As before, a set $A = \{z_1, \ldots, z_n\}$ of measurement points' locations is treated as fixed and all expectations/probabilities are conditional upon A unless stated otherwise. Let us centralize $M(x)$ with $$\hat{m}(x): P\left\{\int_D |M(x) - m(x)|\Phi(dx) \ge \varepsilon\right\} \le \qquad (15)$$
$$P\left\{\int_D |M(x) - \hat{m}(x)|\Phi(dx) + \int_D |\hat{m}(x) - m(x)|\Phi(dx) \ge \varepsilon\right\}$$

and estimate $|\hat{m}(x) - m(x)|$ as:

$$|\hat{m}(x) - m(x)| \le \begin{cases} Kr^\alpha, & \text{if } k_n \ne 0 \\ m(x) \le a, & \text{if } k_n = 0 \end{cases} \qquad (16)$$

Since $$\int_D |\hat{m}(x) - m(x)|\Phi(dx) =$$
$$\int_{\{k_n(\bullet) \ne 0\}} |\hat{m}(x) - m(x)|\Phi(dx) + \int_{\{k(\bullet) = 0\}} |\hat{m}(x) - m(x)|\Phi(dx),$$

the inequality (16) leads to the bound $$\int_D |\hat{m}(x) - m(x)|\Phi(dx) \le Kr^\alpha \Phi(x|k_n(x) \ne 0) + (b-a)\Phi(x|k_n(x) = 0)$$

With the last remark, Markov's inequality $$P(Y \ge t) \le \frac{EY}{t}(t, Y \ge 0),$$

applied to the random variable $$\int_D |M(x) - \hat{m}(x)|\Phi(dx) + (b-a)\Phi(x:k_n(x) = 0)$$

implies:

$$P\left\{\int_D |M(x) - \hat{m}(x)|\Phi(dx) + u_2 \ge \varepsilon - u_1\right\} \le \qquad (17)$$
$$\frac{E \int_D |M(x) - \hat{m}(x)|\Phi(dx) + u_2}{\varepsilon - u_1}$$

where $u_1 = Kr^\alpha \Phi(x|k_n(x) \ne 0)$ and $u_2 = (b-a)\Phi(x|k_n(x) = 0)$. Naturally, r should be such that $Kr^\alpha \Phi(x: k_n(x) \ne 0) < \varepsilon$.

By Fubini's theorem one can swap $\int$ and E in (17). To treat $E|M(s) - \hat{m}(s)|$ for this disclosure the fact $$EY = \int_0^\infty P\{Y \ge t\}dt$$

has been used, which holds for any nonnegative random variable Y if EY exists. That way the assessment of $E|M(s) - \hat{m}(s)|$ is reduced to finding a bound for the corresponding probability. Hoeffding's inequality applied to $P\{|M(x) - \hat{m}(x)| \ge t\}$ bounds the numerator of the right hand side in (17) by $$\int_D \left(\int_0^\infty 2\exp(-2t^2 k_n(x) | (b-a)^2) dt\right) \Phi(dx) + u_2 =$$
$$(b-a)\sqrt{\frac{\pi}{2}} \int_{\{k_n(\bullet) \ne 0\}} \frac{\Phi(dx)}{\sqrt{k_n(x)}}$$

and, consequently inequality (17) now looks as follows:

$$P\left\{\int_D |M(x) - \hat{m}(x)|\Phi(dx) + u_2 \ge \varepsilon - u_1\right\} \le \qquad (18)$$
$$\frac{1}{\varepsilon - u_1}\left((b-a)\sqrt{\frac{\pi}{2}} \int_{\{k_n(\bullet) \ne 0\}} \frac{\Phi(dx)}{\sqrt{k_n(x)}} + u_2\right)$$

Remark: This derivation is true only for those x's where $k_n(x) \ne 0$. Such x's do not contribute to the value of the integral on the right hand side of (7) due to the definition of $M(x)$ and $\hat{m}(x)$. The latter is reflected on of the domain of integration in (17) and (18). In order not to have these reservations in the future and for the convenience in apply ing Fubini's theorem again, let us define random, with respect to set $A=\{z_1, \ldots, z_n\}$, variable $j_n(x)$ as:

$$j_n(x) = \begin{cases} 1/\sqrt{k_n(x)}, & \text{if } k_n(x) \neq 0 \\ 0, & \text{if } k_n(x) = 0 \end{cases}.$$

We can now return to actual probabilities via TEF by taking expectations over all possible sets $A=\{z_1, \ldots, z_n\}$ from both sides of the inequality $$P\left\{\int_D |M(x) - m(x)|\Phi(dx) \geq \varepsilon\right\} \leq \frac{(b-a)\sqrt{\frac{\pi}{2}} \int_D j_n(x)\Phi(dx) + u_2}{\varepsilon - u_1} \quad (19)$$

which follows from (15) and 18). Indeed if Fubini's theorem is applied to the right hand side of (19), we can evaluate $Ej_n(x)$ first and then estimate the integral over D. Following the definition of $j_n$, the calculation of $Ej_n$ can be represented as:

$$Ej_n = E\{j_n; k_n \neq 0\} + E\{j_n; k_n = 0\} = E\{j_n; k_n \neq 0\} = E\{1/\sqrt{k_n}; k_n \neq 0\}$$

In its own order, set $\{k_n \neq 0\}$ can be further split into two subsets $$\{k_n(x) \neq 0\} = \{k_n(x)/n - F(d(x)) > -\beta; k_n(x) \neq 0\} \cap \{k_n(x)/n - F(d(x)) \leq -\beta; k_n(x) \neq 0\}$$

and therefore $$E\{1/\sqrt{k_n}; k_n(x) \neq 0\} = E\{1/\sqrt{k_n}; \{k_n(x)/n - F(d(x)) > -\beta\} \cup \{k_n \neq 0\}\} + E\{1/\sqrt{k_n}; \{k_n(x)/n - F(d(x)) \leq -\beta\} \cup \{k_n \neq 0\}\}$$

This embodiment works with each of two terms separately. Since $\{k_n(x)/n - F(d(x)) > \beta\} \subset \{k_n(x) \neq 0\}$, for the first term $$E\{1/\sqrt{k_n}; \{k_n(x)/n - F(d(x)) > -\beta\} \cup \{k_n \neq 0\}\} =$$

$$E\{1/\sqrt{k_n}; k_n(x)/n - F(d(x)) > -\beta\} < \frac{1}{\sqrt{n(F(d(x)) - \beta}}$$

$$P(k_n(x)/n - F(d(x)) > -\beta) < \frac{1}{\sqrt{n(F(d(x)) - \beta}} < \frac{1}{\sqrt{n(\gamma - \beta}}$$

and for the second $$E\{1/\sqrt{k_n}; \{k_n(x)/n - F(d(x)) \leq -\beta\} \cup \{k_n \neq 0\}\} \leq 1 \cdot P(k_n(x)/n - F(d(x)) \leq -\beta) \leq \exp(-2n\beta^2)$$

The last is Hoeffding's bound for Bernoulli's random variable $k_n(x)$. Here $\beta < \gamma$ is an otherwise arbitrary constant. As the result of this observation:

$$Ej_n < \frac{1}{\sqrt{n(\gamma - \beta}} + \exp(2 - n\beta^2) \quad (20)$$

Notice that this bound depends on r, since $\gamma = \gamma(r)$, but does not depend on x. The next step is to estimate $u_1 = Kr^\alpha E\Phi(x;$ $k_n(x) \neq 0)$. Since $\Phi$ is a probability measure $u_1 \leq Kr^\alpha$. In order to estimate $Eu_2$, the random indicator function $I_{[k_n(\bullet)=0]}(x)$ is introduced and by applying Fubini's theorem:

$$E\Phi(x; k_n(x) = 0) \quad (21)$$

$$= E\int_D I_{[k_n(\bullet)=0]}(x)\Phi(dx)$$

$$= \int_D (E(I_{[k_n(\bullet)=0]}(x)))\Phi(dx)$$

By the definition of indicator function $E(I_{[k_n(\bullet)=0]}(x)) = P(k_n(x) = 0) = (1 - F(d(x)))^n$. Finally, $$\int_D (1 - F(d(x)))^n \Phi(dx) \leq (1 - \gamma)^n.$$

The latter can now be combined with (17), (19) and (20) to enable the bound $$\frac{(b-a)\left(\sqrt{\frac{\pi}{2n(\gamma - \beta)}} + \exp(-2n\beta^2) + (1-\gamma)^n\right)}{\varepsilon - Kr^\alpha} = \quad (22)$$

$$(\sqrt{\pi}/\lambda)h^{-1}(n) + \frac{(b-a)(\exp(-2n\beta^2) + (1-\gamma)^n)}{\varepsilon - Kr^\alpha}$$

This derivation can be summarized as:

Theorem 2. For arbitrary $\varepsilon > 0$, $r < (\varepsilon/K)^{1/\alpha}$ and $\beta < \gamma$, if conditions 1–3 are true the following bound holds:

$$P\left\{\int_D |M(x) - m(x)|\Phi(dx) < \varepsilon\right\} \geq \quad (23)$$

$$1 - (\sqrt{\pi}/\lambda)h^{-1}(n) - \frac{(b-a)(\exp(-2n\beta^2) + (1-\gamma)^n)}{\varepsilon - Kr^\alpha}$$

Remark 1. To bring the formulation of CB to the form similar to the uniform case, observe the inclusion of events $$E_1 = \{\Phi\{x: |M(x) - m(x)| \geq t\} \geq \varepsilon/t\} \subseteq E_2$$

$$= \left\{\int_D |M(x) - m(x)|\Phi(dx) \geq \varepsilon\right\}$$

and consequently $P(E_1) \leq P(E_2)$.

In other words, under the conditions of Theorem 2, one is unlikely to observe large ($\geq t$) absolute deviations of the model M(x) from an unknown phenomenon m(x) over a significant (in terms of $\Phi$) portion of the domain D.

Remark 2. The bounds in both the cases of uniform (14) and integral (23) metrics are functions of r, $\beta$, $\varepsilon$ and n. Since the left hand side of these inequalities depends on $\varepsilon$ as well, a value for $\varepsilon$ is usually picked beforehand by some practical concerns. It is obvious that only by raising n can bounds be made arbitrarily close to 1. For the two other variables there exist optimal values $r=r(n)$ and $\beta=\beta(n)$ to tighten the bound in (22). On the other hand, that is the "slowest" term $$\sqrt{\frac{\pi}{2n(\gamma-\beta)}}$$

which sets the rate of convergence in (22) and (23) as a function of n. Therefore it makes sense to set $\beta(n)$ such that $\exp(-2n\beta^2)=O(n^{1/2})$, e.g. $\beta=(\ln(n)/n)^{1/2}$.

Rate Comparison for Two Metrics

The rates of convergence have been compared for confidence bounds using the integral metric and uniform metric. To make calculations simpler we set here $K=\alpha=1$.

With constant values for $\epsilon$, r, and $\beta$ convergence of the confidence bound is faster for the uniform metric case. However, a scenario when all parameters—$\epsilon$, r, and $\beta$—are functions of n can produce an asymptotic feature with the opposite tendency, i.e. convergence is faster for the case with integral metric. Because the rate of convergence to zero of a sum is not faster then that of a summand, it is sufficient, for instance, to show that with proper choice of $\epsilon(n)$, $r(n)$, and $\beta(n)$ every term in (22) goes to zero faster than, say, the first term, $n^2\exp(-\lambda^2 h^2(n))$, up to the $O(\bullet)$ equivalence, in (14). Choice of $h(n)$ should strike a balance: $h(n)$ must grow fast enough to offset a second degree multiplier $n^2=\exp(2\ln(n))$, but not too fast, so that all terms in (22) converge to zero faster than $\exp(2\ln(n)-\lambda^2 h^2(n))$. If, for example, $r(n)$ is chosen such that $\gamma(n)=(2\ln(n)+\ln\ln\ln(n))/n)^{1/3}$, $\epsilon(n)$ is set as $r(n)+\sqrt{2\lambda^{-1}\gamma(n)}$ and $\beta(n)=(\frac{1}{2})\gamma(n)$ then it can be verified that the bound in (22) is $O(1/\ln(n))^{-1/2}$ which is $o((\ln\ln(n))^{-1})$, whereas the asymptotic behavior of the first term in (14) is like $O((\ln\ln(n))^{-1})$.

Application to a Sample Set of Measurements

Theorem (22) can be applied to a set of sample measurements of the spatial variation of RF field strength on a single channel from a selected antenna.

Lee Model of Propagation

The Lee propagation model, as described in *The Optimization and Application of the W. C. Y Lee Propagation Model in the 1900 MHz Frequency Band*, by Greg Evans, Bob Joslin, Lin Vinson, Bill Foose, 1997 IEEE Vehicular Technology Conference, Phoenix, Ariz., hereby incorporated herein by reference is given by:

$$RSL=P_1-\eta \log \{R/R_{REF}\}+15 \log \{h_b/h_{bREF}\}+10 \log \{P_{tx}/P_{txREF}\}+10 \log(h_m/h_{mREF}) \quad (24)$$

where:

$RSL$=Received signal level, the mean signal level (in dBm) received at distance R from the transmitter.
$P_1$=The signal strength expected for reference conditions ($R_{REF}$, $h_{bREF}$, $P_{txREF}$, and $h_{mREF}$
$\eta$=The slope, i.e. the rate of decay in signal strength (in dB/decade).
R=The distance (in miles) from the transmitter.
$R_{REF}$=The reference distance (in miles).
$h_b$=The height (in feet) of the base transmit antenna.
$h_{bREF}$=The reference height (in feet) of the base transmit antenna.
$P_{tx}$=The transmit ERP (in Watts)
$P_{txREF}$=The reference transmit ERP (in Watts).
$h_m$=The height (in feet) of the mobile receive antenna.
$h_{mREF}$=The reference height (in feet) of the mobile receive antenna.

For the present calculation it can be assumed that the reference conditions hold for transmit power, and transmit and receiver antenna height. Then (24) becomes:

$$RSL=P_1-\eta \log \{R/R_{REF}\} \quad (25)$$

Reasonable values for $\eta$ range from 30 to 40 dB/decade for $R_{REF}=1$ mile. This equation typically applies only to regions beyond the reference distance, because within this radius propagation is dominated by factors other than terrain and clutter. However, the conditions described by (25) are at least as demanding as conditions within the reference radius and therefore (25) provides a reasonable basis for worst-case analysis.

Estimation of Smoothness Parameters (Power Measured in dBm)

For the case where the underlying variable is RF power measured in dBm we have from (2) and (25):

$$|m(x)-m(y)|=|-\eta \log \{R_x/R_{REF}\}+\eta \log \{R_y/R_{REF}\}|=\eta \log \{R_y/R_x\} \quad (26)$$

where $R_x$ and $R_y$ are the values of R at x and y respectively.

In cellular systems the signal loss is a more useful quantity than the actual power. m(x) is the power at x, m(y) is the power at y, and $|m(x)-m(y)|$ measures the difference between them—i.e. the loss. Let:

$$R_x=x, \text{ and } R_y=y \text{ with } R_x>R_{REF} \text{ and } y=x+\rho \quad (27)$$

then (26) becomes:

$$|m(x)-m(y)|=\eta \log \{R_y/R_x\}=\eta \log \{y/x\}=\eta \log \{1+\rho/x\} \quad (28)$$

From (1) and (28) we have:

$$|m(x)-m(y)|=\eta \log \{1+\rho/x\}<K\rho^\alpha \quad (29)$$

A lower bound for $K\rho^\alpha$ is desirable, however, the maximum value of the lower bound can give a conservative estimate of the confidence blanket. This maximum value is found when $x=R_{REF}$. The desired constraint on the smoothness parameters (note that $\rho$ must be measured in miles):

$$K\rho^\alpha>\eta \log(1+\rho/R_{REF}) \quad (30)$$

Inequality (30) establishes a lower bound on the term $K\rho^\alpha$ in the definition of $\lambda$ (18).

$$\lambda=[2/(a-b)^2][\epsilon-\eta \log(1+\rho/R_{REF})]^2 \quad (31)$$

Since the term $K\rho^\alpha$ is replaced by a lower bound involving only $\rho$, the number of free parameters in (11) is reduced to $\rho$, n, $\gamma$, $\epsilon$, and $\beta$ for the assumption that the underlying RF field is given by the Lee model in (24) and the region of interest is outside of a circle of radius $R_{REF}$ from the transmitter. Note that (11) was derived using the Hoeffding inequality. The correct use of the Hoeffding inequality requires that values of $\epsilon$ and $K\rho^\alpha$ be restricted such that:

$$\epsilon>K\rho^\alpha \quad (32)$$

There is one additional consideration for the case where RF power is measured in dBm. Hoeffding's inequality assumes bounded random variables. In the case of RF power in dBm there is of course no natural lower bound since the actual power tends to zero at large distances. However as a practical matter the actual lower limit is non-zero and is set by noise considerations that provide an effective lower bound. This lower limit is likely to be between −100 and −150 dBm. The upper bound is $P_{txREF}$ expressed in dBm. The difference in dBm is the parameter b−a in equation (11).

Numerical Simulation

Figure 3A:
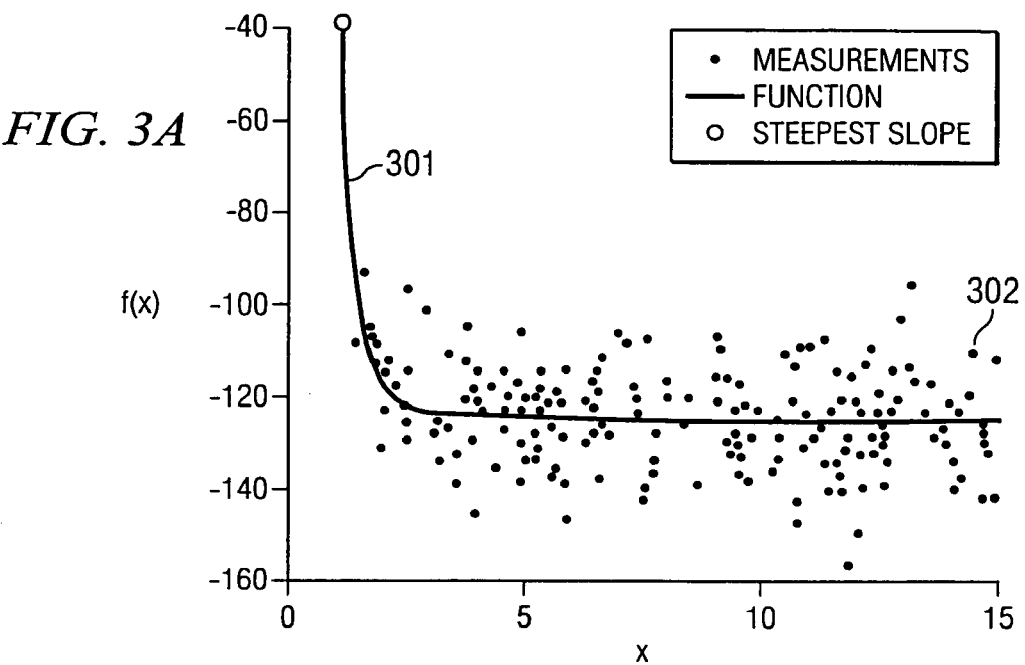
FIGS. 3A, 3B, and 3C illustrate an example test signal and an example set of measurements in a one-dimensional measurement space.
Figure 3B:
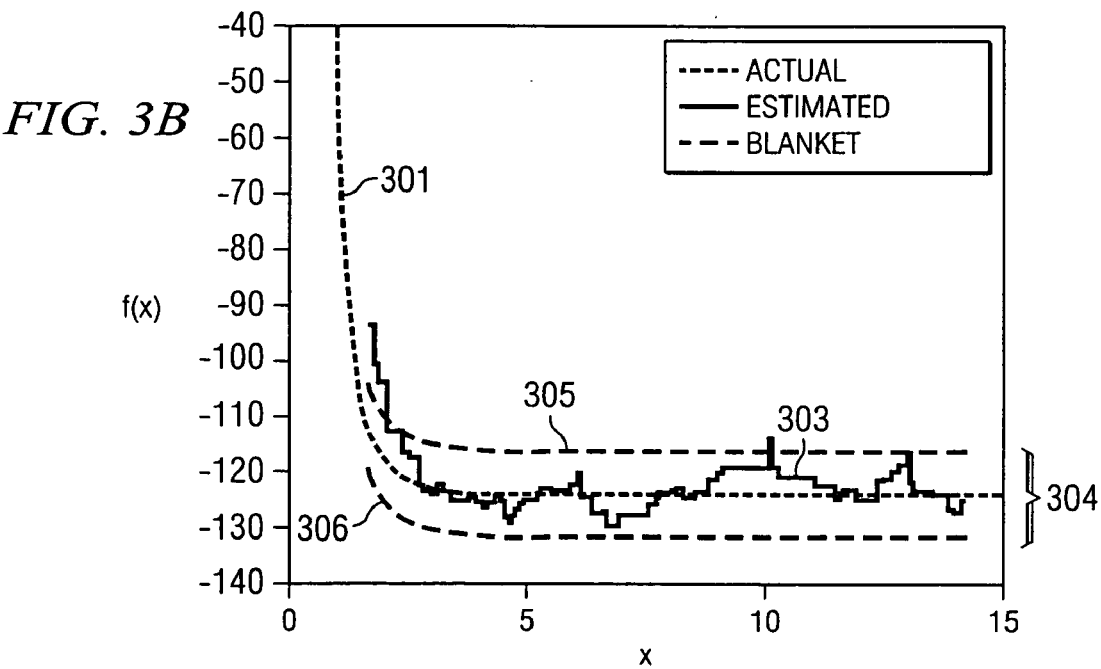
Figure 3C:
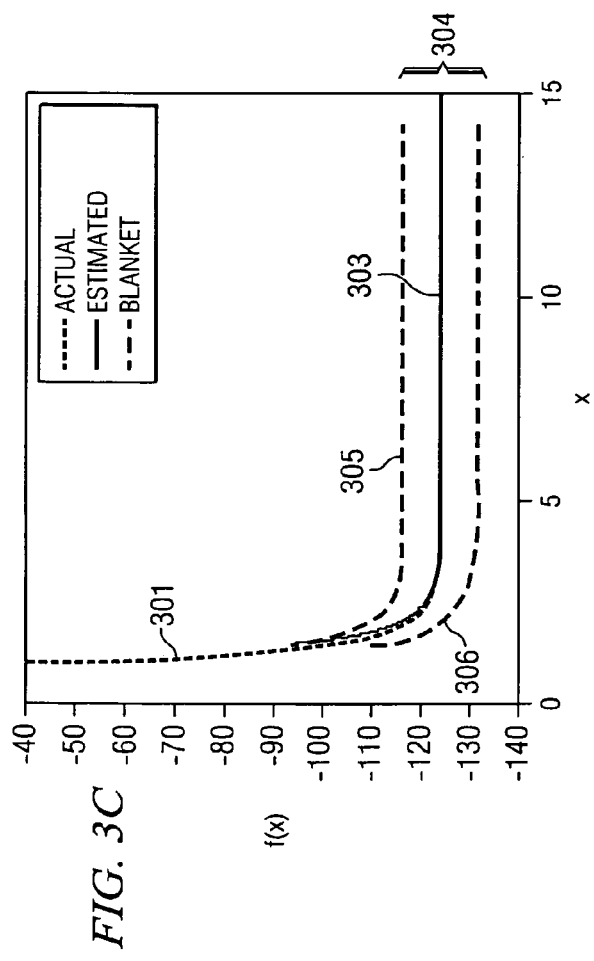

FIGS. 3A, 3B, and 3C illustrate an example test signal and an example set of measurements in a one-dimensional measurement space. In FIG. 3A, test signal 301 is a sample signal as emitted from a cellular telephone tower. Measurements 302 represent measurements made of signal 301 at various distances from an antenna.

Choice of Parameter Values

The signal strength can be set to range between a minimum and maximum observed experimentally, and the RSL can be set to $r^{-3.4}$, a common value for even terrain and moderate clutter. R can be varied from a minimum of 1 mile as described above to a maximum of 15 miles. Measurements 302 made at uniformly-distributed ranges from the signal source are shown in FIG. 3A.

In evaluating equation (25) for this example set of measurements 302, $\epsilon$=8 dB, shown as range 304, is an error bound commonly accepted for drive tests and model optimizations. Parameters a and b are −40 dBm and −125 dBm, respectively, as described above. A choice of $\eta$=34 dB/decade is consistent with the choice of RSL=$r^{-3.4}$ above. Typically, measurement locations are uniformly distributed thus, $\gamma = (x_{max} - x_{min})/2r$. The value for $\beta$ which is chosen to minimize $\delta$, given all the other parameters. Analysis can then be made of the value of $\delta$ for different n. In particular, what value of n is required to give acceptable confidence (e.g., 95%) for realistic values of the other parameters.

A "blanket" may then be created that bounds the interval of $\pm\epsilon$ around the function's known value. Equation (25) bounds the probability that the worst error will exceed $\epsilon$; it does not bound the number of errors. In the present example of FIGS. 3A–3C, there is a uniform sampling of all possible measurement locations, and equation (25) places no restrictions on the locations. Equation (25) gives an analysis of the fraction of trials in which the worst measurement is in error by $\epsilon$ or more. FIG. 3B illustrates an upper bound 305 and a lower bound 306 forming a blanket of thickness $\epsilon$. The analysis represented by FIGS. 3A and 3B uses n=50. For 50 measurements, equation (25) gives $\delta$=39,398—this is not typically a useful bound. As a result, the reconstructed (or estimated) signal 303 does not reasonably resemble underlying signal 301. For a useful bound, larger values of n become necessary. Thus, in order to give a useful confidence, a large number of measurements may be necessary. For a $\delta$=0.05 (95% confidence), for example, a system may need an n on the order of 530,000 measurements. An analysis of the present example using n=530,000 is shown in FIG. 3C.

Figure 4:
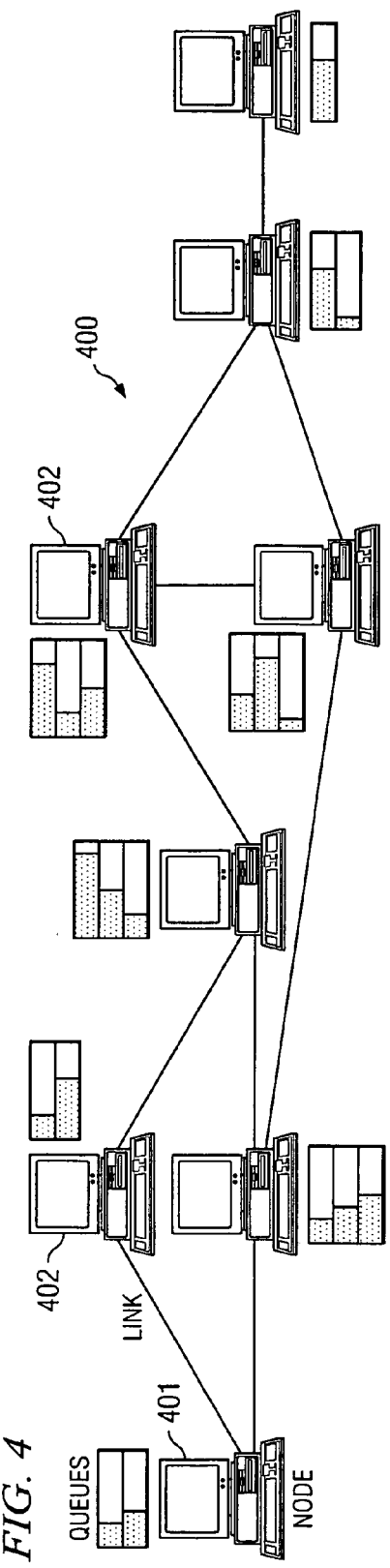
FIG. 4 is an illustration of a computer network management system.

The preceding methods are not limited to utilization in cellular telephone networks, but rather may be used in any system requiring the estimation of an underlying phenomenon. FIG. 4 is an illustration of a computer network management system. In network 400, an agent can be launched that piggy-backs itself on a randomly-chosen outbound message, and arrives at whichever node 402 is the destination. Once there, the agent program can measure a designated message queue parameter (average length, longest, shortest, or other parameter). The agent program then reports this information, along with its location, back to host node 401. For this simple example, location may be the number of hops from host node 401. To reconstruct the queue length at an arbitrarily chosen node, a designer may consider an interval, r hops in radius, centered at the chosen node, and average all the queue length measurements lying inside the interval. The resulting Confidence Blanket calculated by the above method, would bound the confidence that the reconstruction would differ from the true value by >$\epsilon$.

Figure 5:
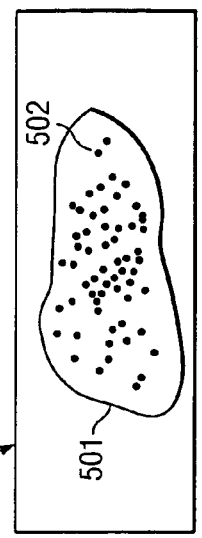
FIG. 5 is an illustration of a method for determining the density of cancer cells in accordance with an embodiment of the present invention.

FIG. 5 is an illustration of a system for determining the density of cancer cells in accordance with an embodiment of the present invention. Microscope slide 500 contains a cross-section 501 of tissue. To determine how the density of cancer cells varies across the slide (e.g. away from the center of a tumor), the microscope, set to high magnification, is moved to a randomly-chosen location, and cancer cells 502 in the field of view are counted. The resulting number is one measurement. If this procedure is repeated over a number of randomly selected points, the density can be reconstructed. On a uniform grid, a designer may consider a circle of radius r centered at each grid coordinate, and average all the measurements inside the circle. The Confidence Blanket computation would apply as before.

Figure 6:
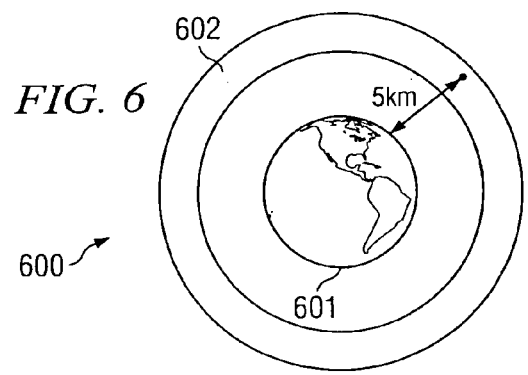
FIG. 6 is an illustration of a system for determining the air temperature a distance from the Earth's surface.

FIG. 6 is an illustration of a system for determining the air temperature a distance from the Earth's surface. System 600 determines the air temperature of a band 602 that is 5 km above Earth's surface 601. By taking sample measurements from weather balloons, airplanes, or the like, data points can be acquired at specific longitude, latitude and altitude. To reconstruct the temperature on a uniform grid (or along a flight path or other useful construct), the system can consider a sphere of radius r centered at each position of interest, and average all the measurements falling inside it. The Confidence Blanket computation would apply as before.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 7:
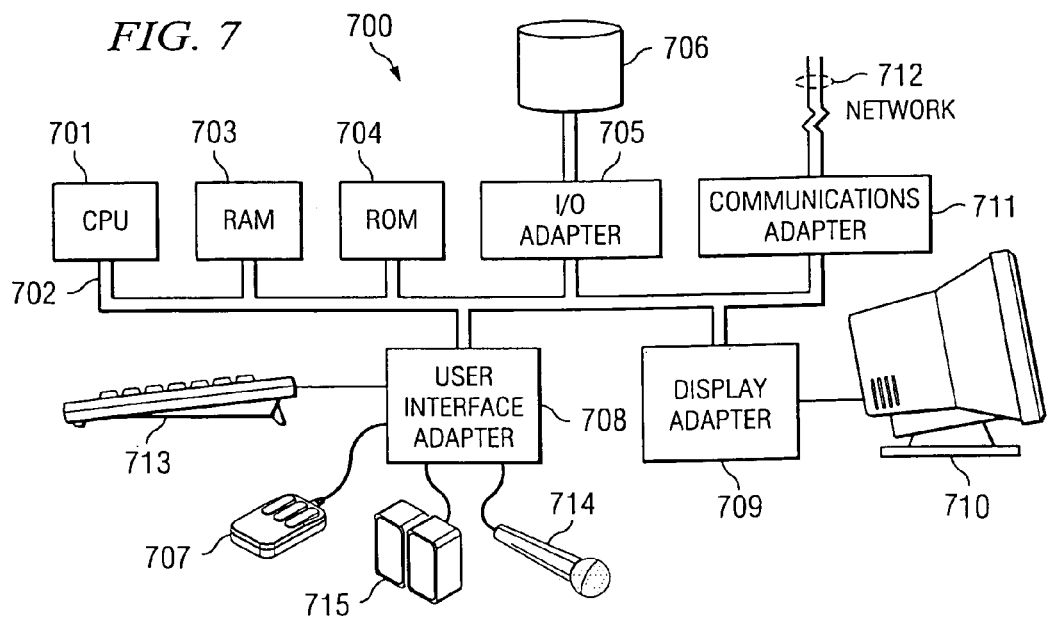
FIG. 7 illustrates an example computer system 700 adapted according to embodiments of the present invention.

FIG. 7 illustrates an example computer system 700 adapted according to embodiments of the present invention. That is, computer system 700 comprises an example system on which embodiments of the present invention may be implemented. Central processing unit (CPU) 701 is coupled to system bus 702. CPU 701 may be any general purpose CPU. However, the present invention is not restricted by the architecture of CPU 701 as long as CPU 701 supports the inventive operations as described herein. CPU 701 may execute the various logical instructions according to embodiments of the present invention. For example, CPU 701 may execute machine-level instructions according to the exemplary calculations described in conjunction with the Confidence Blankets.

Computer system 700 also preferably includes random access memory (RAM) 703, which may be SRAM, DRAM, SDRAM, or the like. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information, such as parameters necessary for the calculation of confidence levels.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for the appropriate calculations or the retention of phenomena measurements. Communications adapter 711 is preferably adapted to couple computer system 700 to network 712. User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display a user interface of embodiments of the present invention.

It shall be appreciated that the present invention is not limited to the architecture of system 700. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of reconstructing an underlying phenomenon, said method comprising:
    establishing an upper bound and a lower bound for a value of said phenomenon at every point within a measurement space;
    acquiring a number of measurements for said phenomenon, wherein said number ensures that said value of said phenomenon lies between said upper and said lower bound at every point within said measurement space to a probability sufficient for said upper and said lower bounds to be used as a reconstruction of said phenomenon; and
    reconstructing said phenomenon using said upper and lower bound, wherein said reconstruction does not require a prediction of a form of said phenomenon.

2. The method of claim 1 further comprising:
    providing at least one platform for taking said measurements.

3. The method of claim 1 wherein said number of measurements is used to calculate a bound for said probability.

4. The method of claim 1 wherein said probability is sufficiently high, and a range between said upper and said lower bounds is sufficiently small, that said range can be used to predict said phenomenon.

5. The method of claim 4 wherein said probability is a function of said range.

6. The method of claim 1 wherein said probability is a function of a higher order integral metric.

7. The method of claim 6 wherein said probability is a function of volume between said upper and lower bounds.

8. The method of claim 1 wherein said upper bound and said lower bound comprise a confidence blanket.

9. The method of claim 1 wherein said measurement space is further divided into a plurality of sub-regions.

10. The method of claim 9 wherein said upper bound and said lower bound are independently determined in each said sub-region.

11. The method of claim 1 where said phenomenon is one of a signal from a transmission tower, a computer message queue parameter, a density of cells, or an atmospheric condition.

12. The method of claim 1 wherein said reconstruction is used in managing an acquisition of said measurements of said phenomenon.

13. The method of claim 12 wherein said management comprises:
    discarding measurements unnecessary for an acceptable reconstruction of said phenomenon.

14. The method of claim 1 wherein said measurements are taken using mobile measurement platforms.

15. A computer readable medium storing computer executable code, said code comprising:
    code calculating an upper bound and a lower bound for a value of a phenomenon using measurements of said phenomenon;
    code calculating a bound for a probability that a value of said phenomenon lies between said upper bound and said lower bound, wherein said probability bound is dependent upon the number of said measurements; and
    code reconstructing said phenomenon using said upper and lower bound, wherein said reconstruction does not reciuire a prediction of a form of said phenomenon.

16. The code of claim 15 further comprising:
    code calculating said upper bound and said lower bound at a plurality of coordinates in a measurement space.

17. The code of claim 16 wherein said measurement space is a three-dimensional space.

18. The code of claim 15 further comprising:
    code calculating a number of measurements necessary to generate a predetermined probability bound.

19. The code of claim 18 further comprising:
    code storing measurements at coordinates within said measurement space, wherein said probability is lower than a predetermined level.

20. A system for reconstructing a transmission signal, said system comprising:
    at least one measurement platform capable of measuring a value of said signal;
    computer readable memory storing measurements of said signal in communication with said at least one platform;
    a means for calculating an upper bound and a lower bound for said signal at every point within a measurement space using said stored measurements;
    a means for calculating a probability that the value of said signal lies between said upper and said lower bound; and means for reconstructing said transmission signal value using said upper and lower bound, wherein said reconstruction does not reciuire a prediction of a form of said phenomenon.

21. The system of claim 20 wherein said probability calculating means calculates a bound for said probability.

22. The system of claim 20 wherein said measurement platform is mobile.

23. The system of claim 20 further comprising:
a measurement space containing at least a portion of said transmission signal, and wherein said probability is used to determine if further measurements of said transmission signal are necessary at a particular coordinate in measurement space.

24. The system of claim 23 wherein said measurement space is further divided into sub-regions, and wherein said upper and said lower bound is calculated for each said sub-region.

* * * * *

UNITED STATES PATENT AND TRADEMARK OFFICE
CERTIFICATE OF CORRECTION

| | | |
|---|---|---|
| PATENT NO. | : 7,149,651 B2 | |
| APPLICATION NO. | : 10/846061 | |
| DATED | : December 12, 2006 | |
| INVENTOR(S) | : Kanevsky et al. | |

It is certified that error appears in the above-identified patent and that said Letters Patent is hereby corrected as shown below:

On the Title page, in field (56), under "Other Publications", in column 2, line 21, delete "Juan-Liacer" and insert -- Juan-Llacer --, therefor.

In column 18, line 41 (Approx.), in Claim 15, delete "reciuire" and insert -- require --, therefor.

In column 19, line 3, in Claim 20, delete "reciuire" and insert -- require --, therefor.

Signed and Sealed this

First Day of May, 2007

JON W. DUDAS
*Director of the United States Patent and Trademark Office*